US008963949B2

(12) United States Patent
Forutanpour et al.

(10) Patent No.: US 8,963,949 B2
(45) Date of Patent: Feb. 24, 2015

(54) IMAGE SELECTION AND COMBINATION METHOD AND DEVICE

(75) Inventors: Babak Forutanpour, Carlsbad, CA (US); Jingqiang Li, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 650 days.

(21) Appl. No.: 12/428,295

(22) Filed: Apr. 22, 2009

(65) Prior Publication Data

US 2010/0271393 A1 Oct. 28, 2010

(51) Int. Cl.
 G06T 5/50 (2006.01)
 G09G 5/00 (2006.01)
(52) U.S. Cl.
 CPC ......... G06T 5/50 (2013.01); *G06T 2207/20148* (2013.01); *G06T 2207/20216* (2013.01)
 USPC ............................ 345/611; 345/629; 345/634
(58) Field of Classification Search
 CPC ....... G06T 3/4053; G06T 5/50; G06T 15/503; G06T 2200/12; H04N 5/23229; H04N 5/23232; H04N 5/2355; H04N 5/2356
 USPC .............................. 345/611; 348/208.1, 208.6
 See application file for complete search history.

(56) References Cited

U.S. PATENT DOCUMENTS

| 4,949,391 | A | 8/1990 | Faulkerson et al. |
| 5,420,865 | A | 5/1995 | Swanbery |
| 2005/0053309 | A1* | 3/2005 | Szczuka et al. ............... 382/284 |
| 2006/0012830 | A1 | 1/2006 | Aiso |
| 2006/0023223 | A1* | 2/2006 | Bennison ...................... 356/457 |
| 2006/0109903 | A1 | 5/2006 | Bergen et al. |
| 2006/0245640 | A1* | 11/2006 | Szczuka ........................ 382/154 |
| 2006/0256231 | A1 | 11/2006 | Sasaki et al. |
| 2009/0189900 | A1 | 7/2009 | Furukawa et al. |
| 2009/0297059 | A1* | 12/2009 | Lee et al. ....................... 382/275 |

FOREIGN PATENT DOCUMENTS

| CN | 101203884 A | 6/2008 |
| CN | 101305397 A | 11/2008 |
| JP | 2006033062 A | 2/2006 |
| JP | 2006319782 A | 11/2006 |
| JP | 2007036359 A | 2/2007 |
| JP | 2008092297 A | 4/2008 |
| JP | 2009049575 A | 3/2009 |
| WO | 02104009 A1 | 12/2002 |
| WO | WO 2005/122084 | * 12/2005 |
| WO | WO2006119802 | 11/2006 |
| WO | WO2007042074 | 4/2007 |
| WO | 2010124065 A1 | 10/2010 |

OTHER PUBLICATIONS

International Search Report and Written Opinion—PCT/US2010/032019, International Search Authority—European Patent Office—Jul. 14, 2010.
Taiwan Search Report—TW099110804—TIPO—Mar. 24, 2013.

* cited by examiner

*Primary Examiner* — Jeffrey A Brier
(74) *Attorney, Agent, or Firm* — James R. Gambale, Jr.

(57) ABSTRACT

A method is disclosed that includes receiving multiple sequential images captured by an image capture device. The method includes selecting a subset of the multiple sequential images that are aligned to each other. The method further includes averaging pixel values from each image in the subset of the multiple sequential images to produce a combined image.

21 Claims, 8 Drawing Sheets

IMAGE SELECTION AND COMBINATION METHOD AND DEVICE

FIELD OF THE DISCLOSURE

The present disclosure is generally directed to image selection and combination.

BACKGROUND

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and Internet Protocol (IP) telephones, can communicate voice and data packets over wireless networks. Further, many such wireless telephones include other types of devices that are incorporated therein. For example, wireless telephones can also include a digital still camera, a digital video camera, a digital recorder, and an audio file player. Also, such wireless telephones can process executable instructions, including software applications, such as a web browser application, that can be used to access the Internet. As such, these wireless telephones can include significant computing capabilities.

Digital signal processors (DSPs), image processors, and other processing devices are frequently used in portable personal computing devices that include digital cameras, or that display image or video data captured by a digital camera. Such processing devices can be utilized to provide video and audio functions, to process received data such as image data, or to perform other functions.

One type of image processing involves improving the signal to noise ratio (SNR) of digital images. Reducing noise such as dark current, photon noise, and cross-talk may result in better pictures. The signal to noise ratio (SNR) may be particularly low for low light photography. One way to reduce noise in an image is to run a low pass filter over an image while using an edge detector to protect edge boundaries. However, even if the edges are protected, the filter affects the textures in the scene, because it may be difficult to discern between texture and noise. Another way to reduce noise is to combine two or more images, but this may lead to ghosting. Yet another way to reduce noise is to combine portions of two or more images in order to minimize ghosting. However, this may be computationally expensive and is less likely to reduce noise around moving objects because fewer macro blocks may be used.

SUMMARY

Cameras are able to take many pictures at once in a "burst mode." For example, a camera may be able to take up to 60 six megapixel (6 MP) pictures per second. This technology may be leveraged to reduce noise that is common in digital photography, not just for low light conditions or hand jitter reduction, but for all pictures. An object, such as a pair of eyes, may be tracked from frame to frame and only those frames are combined where the selected object seems stationary between the frames. Combining only those frames provides improved results when the pictures are merged together.

In a particular embodiment, a method is disclosed that includes receiving multiple sequential images captured by an image capture device. The method includes selecting a subset of the multiple sequential images that are aligned to each other. The method further includes averaging pixel values from each image in the subset of the multiple sequential images to produce a combined image.

In another embodiment, an apparatus is disclosed that includes an image processing system configured to select a subset of multiple sequential images that are aligned to each other. The image processing system is also configured to average pixel values from each image in the subset of the multiple sequential images to produce a combined image.

In another embodiment, an integrated circuit is disclosed that includes image processing circuitry configured to process multiple sequential images. The image processing circuitry is configured to select a subset of the multiple sequential images that are aligned to each other. The image processing circuitry is also configured to average pixel values from each image in the subset of the multiple sequential images to produce a combined image.

In another embodiment, an apparatus is disclosed that includes means for selecting a subset of multiple sequential images that are aligned to each other. The apparatus further includes means for averaging pixel values from each image in the subset of the multiple sequential images to produce a combined image.

In another embodiment, a computer-readable medium storing computer executable code is disclosed. The computer-readable medium includes code for receiving multiple sequential images captured by an image capture device. The computer-readable medium also includes code for selecting a subset of the multiple sequential images that are aligned to each other. The computer-readable medium further includes code for averaging pixel values from each image in the subset of the multiple sequential images to produce a combined image.

One particular advantage provided by disclosed embodiments is an ability to improve a signal to noise ratio (SNR) of snapshots with no perceived loss in sharpness on a focus chart. For example, a green patch standard deviation (STD) may be reduced significantly across all channels, such as a red (R) channel, a green (G) channel, and a blue (B) channel.

Another advantage provided by disclosed embodiments is that the system may be tunable via a single parameter so that a user may tradeoff between desired noise reduction (how many images to combine) and sharpness (how few images to combine). The system may employ saliency detection so that a sharpness of key regions, such as faces and eyes, is not sacrificed for overall noise reduction. The system may have a reduced central processing unit (CPU) complexity by leveraging face detection from a camera preview.

Other aspects, advantages, and features of the present disclosure will become apparent after review of the entire application, including the following sections: Brief Description of the Drawings, Detailed Description, and the Claims.

DETAILED DESCRIPTION

Figure 1:
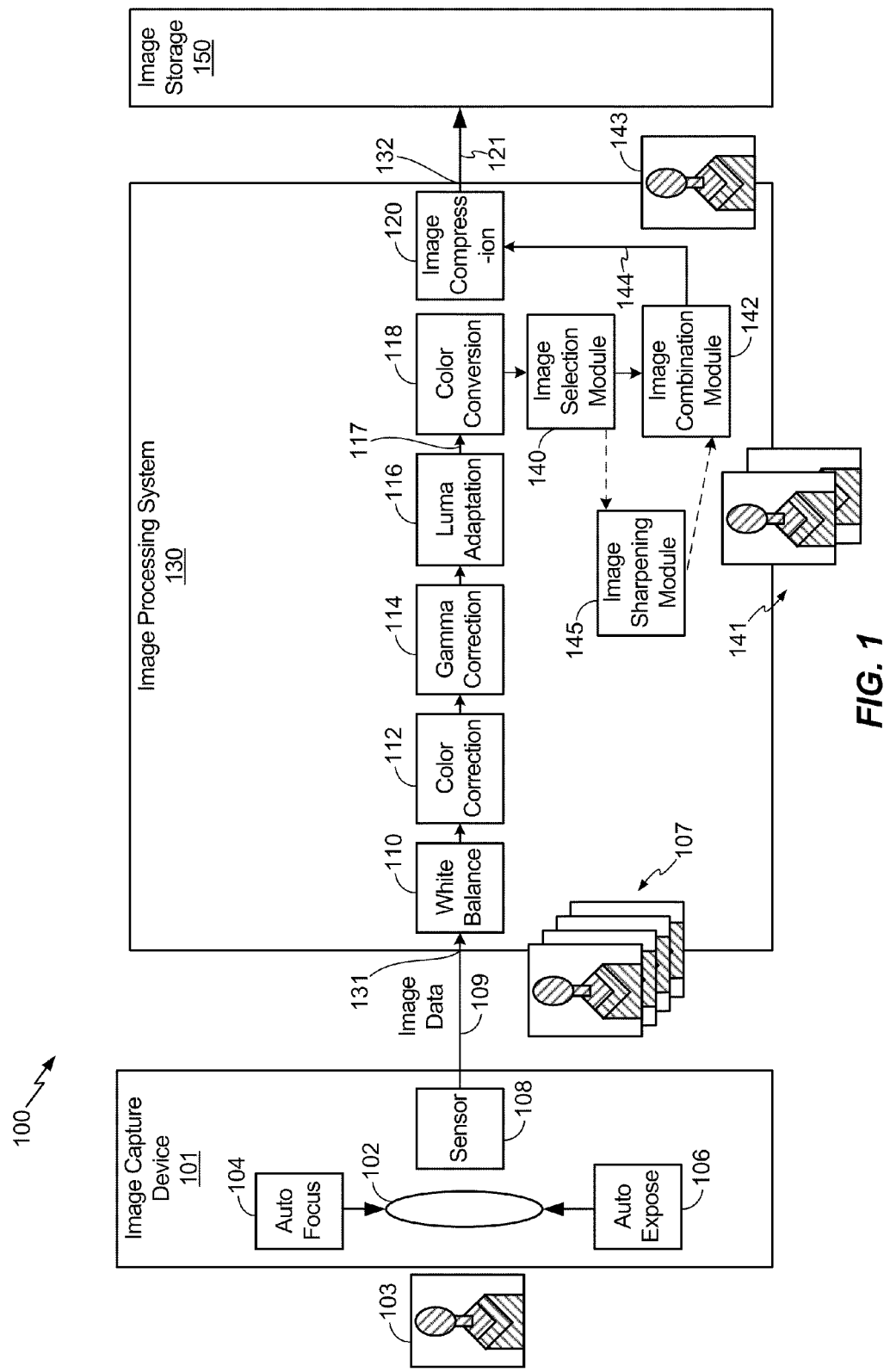
FIG. 1 is a block diagram of a particular illustrative embodiment of an image selection and combination system.

Referring to FIG. 1, a block diagram of a particular illustrative embodiment of an image selection and combination system 100 is shown. The image selection and combination system 100 includes an image capture device 101 coupled to an image processing system 130. The image processing system 130 is coupled to an image storage 150. The image storage 150 may be a random access memory (RAM) device or a non-volatile memory device such as a read-only memory (ROM) or flash memory. The image capture device 101 includes a sensor 108, an autofocus controller 104, and an autoexposure controller 106. The autofocus controller 104 and the autoexposure controller 106 are each coupled to a lens system 102. Generally, the image selection and combination system 100 includes the image processing system 130 to enable the selection of a subset 141 of multiple sequential images 107 of an image 103 captured in a "burst" of images resulting from a single image capture command, and to enable the combination of the subset 141 to produce a combined image 143.

The image capture device 101 may be configured to capture the multiple sequential images 107 of the image 103 in the burst of images resulting from a single image capture command. For example, the image capture device 101 may be configured to capture up to about sixty sequential images, each having up to about six megapixels (MP), in a burst of about one second.

The image processing system 130 may be configured to select the subset 141 of the multiple sequential images 107 that are aligned to each other using an image selection module 140. The image selection module 140 may leverage face detection from an image preview operation to select the subset 141 of the multiple sequential images 107 that are aligned to each other. Alternatively, the image selection module 140 may leverage skin detection from an image preview operation to select the subset 141 of the multiple sequential images 107 that are aligned to each other. The image processing system 130 may also be configured to average pixel values from each image in the subset 141 of the multiple sequential images 107 to produce the combined image 143 using an image combination module 142. The image processing system 130 may further be configured to sharpen the subset 141 of the multiple sequential images 107 that are aligned to each other using a sharpening module 145 before averaging the pixel values from each image in the subset 141 of the multiple sequential images 107 to produce the combined image 143 using the image combination module 142.

During operation, multiple sequential images of the image 103 are autofocussed and autoexposed through the lens system 102 and are sensed by the sensor 108. Image data including the multiple sequential images 107 is output from the sensor 108, as shown by the arrow 109, and input to the image processing system 130 at an entrance 131 to an image processing pipeline. The image data is successively processed by a white balance device 110, a color correction device 112, a gamma correction device 114, and a luma adaptation device 116 before being an input 117 to a color conversion device 118.

After color conversion in the color conversion device 118, the processed image data is input to an image selection module 140. The image selection module 140 selects a subset 141 of the multiple sequential images 107 that are aligned to each other. The image selection module 140 is coupled to the image combination module 142 that averages pixel values from each image in the subset 141 of the multiple sequential images 107 to produce a combined image 143. The combined image 143 may have reduced random noise relative to each of the subset 141 of the multiple sequential images 107 used to produce the combined image 143. The combined image 143 is an input 144 to an image compression device 120 and output from the image processing system 130 at an exit 132 from the image processing pipeline, as shown by the arrow 121, and input to the image storage 150.

In an alternative embodiment, the selection of the subset 141 of the multiple sequential images 107 that are aligned to each other is performed at the image selection module 140 of the image processing pipeline of the image processing system 130, while the averaging of the pixel values from each image in the subset 141 of the multiple sequential images 107 to produce a combined image is performed after the subset 141 is stored in the image storage 150. In another alternative embodiment, the selection of a subset of the multiple sequential images 107 that are aligned to each other as well as the averaging of the pixel values from each image in the subset of the multiple sequential images 107 to produce a combined image are performed after the multiple sequential images 107 are stored in the image storage 150.

The image selection module 140 together with the image combination module 142 may enable an improvement of the signal to noise ratio (SNR) of snapshots with little or no perceived loss in sharpness on a focus chart. For example, a green patch standard deviation (STD) may be reduced across all channels, such as the red (R) channel, the green (G) channel, and the blue (B) channel. The image processing system 130 having the image selection module 140 along with the image combination module 142 may be tunable via a single parameter so that the user may tradeoff between a desired amount of noise reduction (how many images to combine) and sharpness (how few images to combine). The single parameter may be the number of images to combine. Saliency detection, such as the detection of salient features in the images, may be employed to ensure that the sharpness of key regions, such as faces and eyes, is not sacrificed for overall noise reduction. The image processing system 130 having the image selection module 140 along with the image combination module 142 may achieve a reduced central processing unit (CPU) complexity by leveraging face detection from a camera preview operation, for example.

Figure 2:
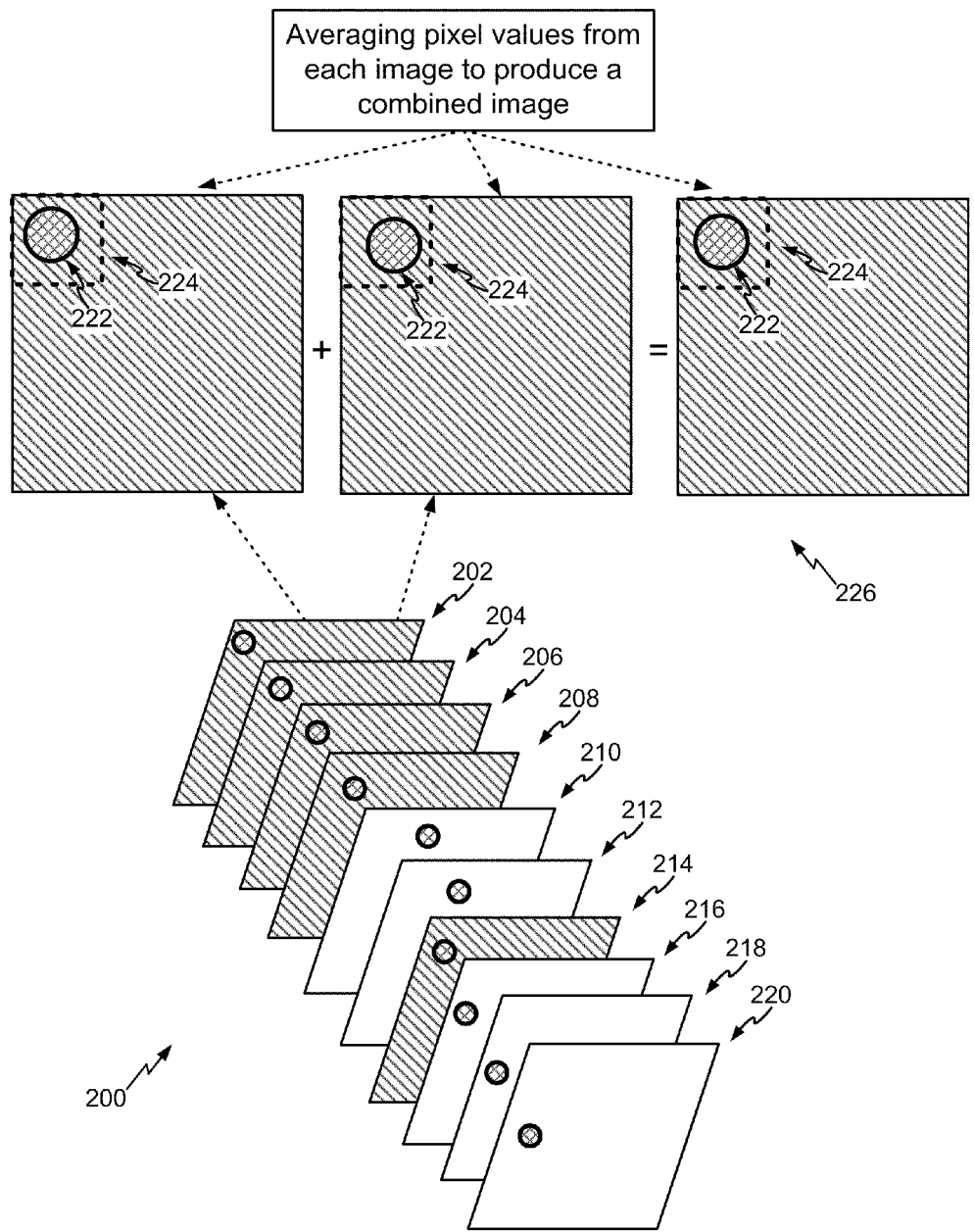
FIG. 2 is an illustrative diagram of a first embodiment of a subset of multiple sequential images that are aligned to each other.

Referring to FIG. 2, an illustrative diagram of a first embodiment of a subset of multiple sequential images 200 that are aligned to each other is shown. In an illustrative embodiment, the multiple sequential images 200 are similar to the multiple sequential images 107 of FIG. 1. Each of the multiple sequential images may be referred to as a frame. An object 222 in a region of interest 224 may be tracked from frame to frame. Frames where the object 222 in the region of interest 224 appears to be stationary may be selected to be combined or merged together. Two frames may be aligned to each other when the object 222 is in the same region of interest 224 in both frames. For example, frames 202 and 204 may be aligned to each other because the object 222 is in the region of interest 224 in both frames. As shown in FIG. 2, pixel values for each image may be averaged to produce a combined image 226. In an illustrative embodiment, the combined image 226 is similar to the combined image 143 of FIG. 1.

In some frames, the object 222 may not be in the region of interest 224 because of movement of a hand holding the image selection and combination system 100. The dark frames 202, 204, 206, 208, and 214 may form a subset of the multiple sequential images 200 that are aligned to each other. The light frames 210, 212, 216, 218, and 220 may not be aligned with the dark frames 202, 204, 206, 208, and 214. Combining frames that are not aligned to each other may result in "ghosting," where the object 222 appears to be in two places in the combined image. For example, the subset of the dark frames 202, 204, 206, 208, and 214 of FIG. 2 may have the best chance of minimizing or reducing ghosting in the region of interest 224 in the upper left-hand corner when combined. In a particular embodiment, selecting the subset of the multiple sequential images 200 that are aligned to each other includes detecting in real-time a first set of images, such as the dark frames 202, 204, 206, 208, and 214, having at least one stationary region of interest, where the object 222 is in the region of interest 224, and removing a second set of images, such as the light frames 210, 212, 216, 218, and 220, not having the at least one stationary region of interest, where the object 222 is not in the region of interest 224.

Figure 3:
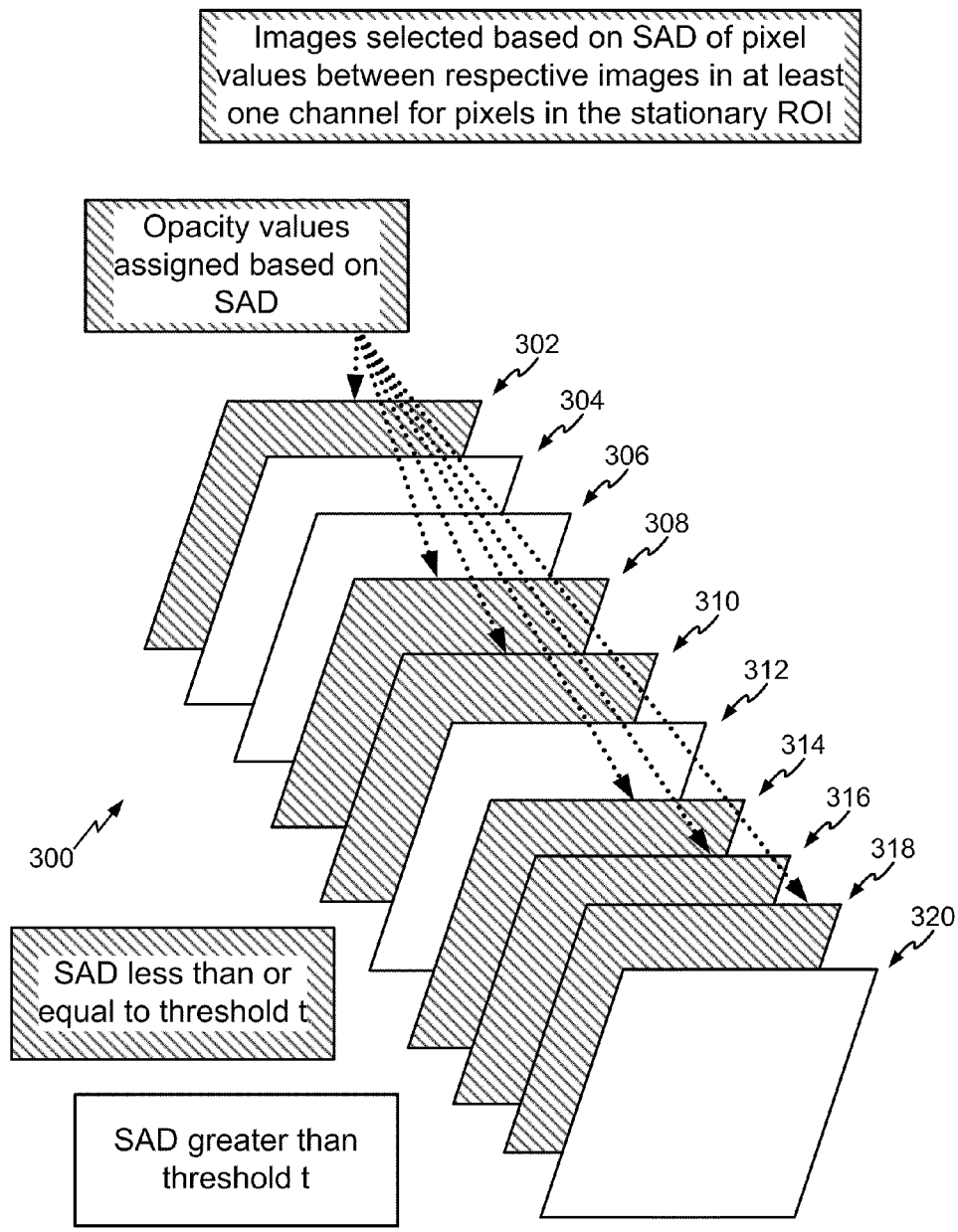
FIG. 3 is an illustrative diagram of a second embodiment of a subset of multiple sequential images that are aligned to each other.

Referring to FIG. 3, an illustrative diagram of a second embodiment of a subset of multiple sequential images 300 that are aligned to each other is shown. In an illustrative embodiment, the multiple sequential images 300 are similar to the multiple sequential images 107 of FIG. 1 and similar to the multiple sequential images 200 of FIG. 2. The selected subset of the multiple sequential images may include frames that are non-contiguous or non-sequential. For example, the dark frame 302 may be combined with the dark frames 308, 310, 314, 316, and 318 because of a mutual alignment of a stationary region of interest between the respective frames. The light frames 304, 306, 312, and 320 may not be combined because of a lack of a mutual alignment of a stationary region of interest between the respective frames.

As described in more detail below, images may be selected based on a sum of absolute differences (SAD) of pixel values between respective images in at least one channel, such as red (R), green (G), or blue (B), for pixels in the stationary region of interest. For example, the dark frames 308, 310, 314, 316, and 318 may each have a sum of absolute differences (SAD) with respect to the dark frame 302 in the region of interest (ROI) that is less than or equal to a threshold value t. Similarly, the light frames 304, 306, 312, and 320 may each have a sum of absolute differences (SAD) with respect to the dark frame 302 in the region of interest (ROI) that is greater than the threshold value t. Opacity values used to combine the frames, as described in more detail below, may be assigned to the dark frames 302, 308, 310, 314, 316, and 318 based on the sum of absolute differences (SAD) with respect to the dark frame 302 in the region of interest (ROI).

Figure 4:
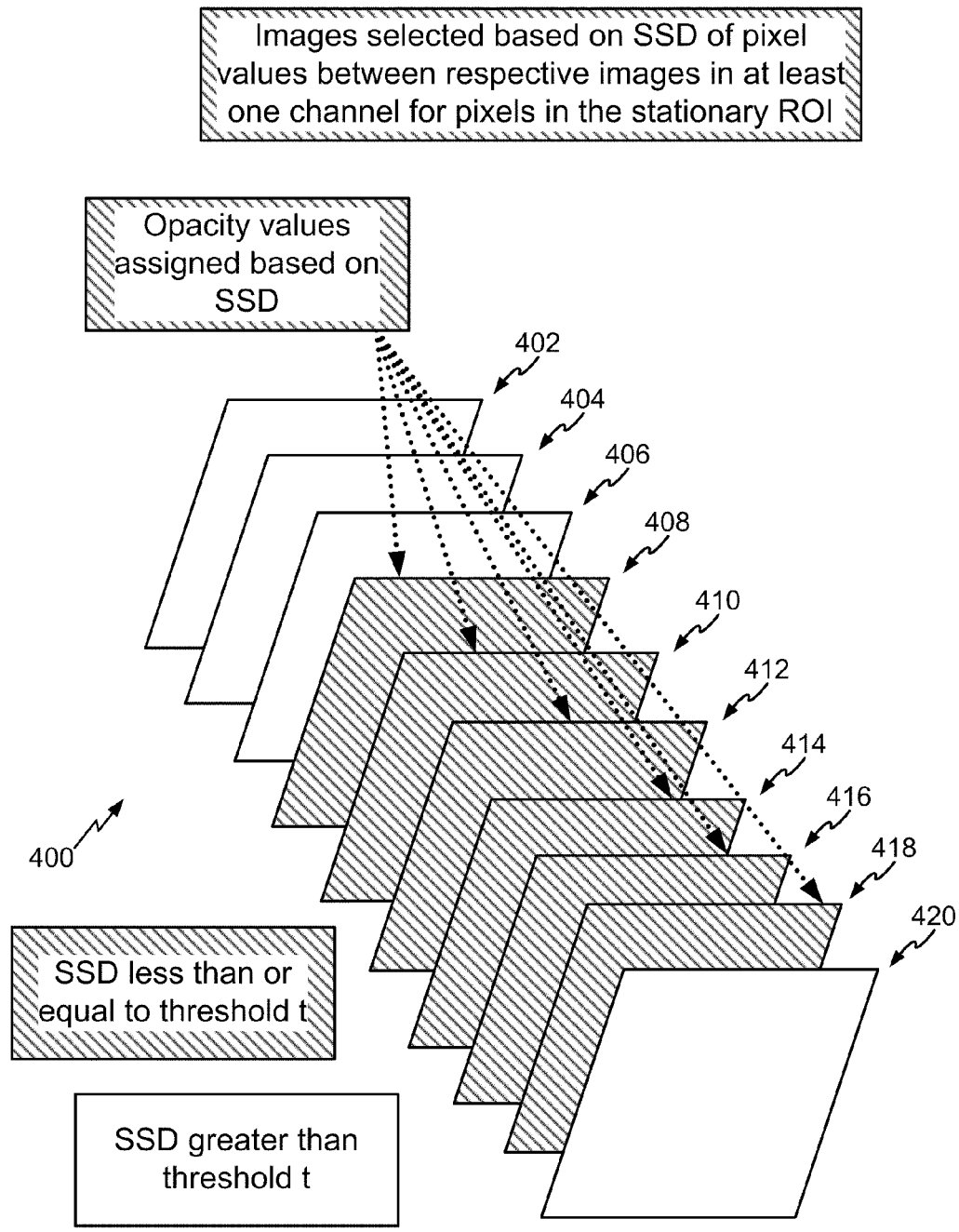
FIG. 4 is an illustrative diagram of a third embodiment of a subset of multiple sequential images that are aligned to each other.

Referring to FIG. 4, an illustrative diagram of a third embodiment of a subset of multiple sequential images 400 that are aligned to each other is shown. In an illustrative embodiment, the multiple sequential images 400 are similar to the multiple sequential images 107 of FIG. 1, the multiple sequential images 200 of FIG. 2, and the multiple sequential images 300 of FIG. 3. The selected subset of the multiple sequential images may include frames that are not at the beginning of the sequence of frames. For example, dark frames 408, 410, 412, 414, 416, and 418 may be combined because hand motion due to pressing a snapshot button of the image selection and combination system 100 of FIG. 1 may have caused light frames 402, 404, and 406 to not register well, or to be out of alignment with, the dark frames 408, 410, 412, 414, 416, and 418.

As described in more detail below, images may be selected based on a sum of squares of differences (SSD) of pixel values between respective images in at least one channel, such as luminance (Y), blue chrominance (Cb), or red chrominance (Cr), for pixels in the stationary region of interest. For example, the dark frames 408, 410, 414, 416, and 418 may each have a sum of squares of differences (SSD) with respect to the dark frame 412 in the region of interest (ROI) that is less than or equal to a threshold value T. Similarly, the light frames 402, 404, 406, and 420 may each have a sum of squares of differences (SSD) with respect to the dark frame 412 in the region of interest (ROI) that is greater than the threshold value T. Opacity values used to combine the frames, as described in more detail below, may be assigned to the dark frames 408, 410, 412, 414, 416, and 418 based on the sum of squares of differences (SSD) with respect to the dark frame 412 in the region of interest (ROI).

In a particular embodiment, the subset of the multiple sequential images includes images that have at least one stationary region of interest. For example, frames 202, 204, 206, 208, and 214 of FIG. 2 may have at least one stationary region of interest 224 in the upper left-hand corner. In some images, the at least one stationary region of interest may include at least one pair of eyes.

In a particular embodiment, the images that have the at least one stationary region of interest are selected based at least in part on a sum of absolute differences (SAD) of pixel values between respective images in at least one channel for pixels in the at least one stationary region of interest. For example, the sum of absolute differences (SAD) of pixel values between a first image, referred to as image 1, and a second image, referred to as image 2, in a red (R) channel for pixels i in the at least one stationary region of interest (ROI) may be defined by $$SAD_{R12} = \sum_{i \subset ROI} |R_{i1} - R_{i2}|,$$

where $R_{i1}$ is the red value of pixel i in image 1 and $R_{i2}$ is the red value of pixel i in image 2. Generally, the sum of absolute differences (SAD) of pixel values between image j and image k in the α channel for pixels i in the at least one stationary region of interest (ROI) may be defined by $$SAD_{\alpha jk} = \sum_{i \subset ROI} |\alpha_{ij} - \alpha_{ik}|,$$

where α=R, G, B or α=Y, Cb, Cr, for example. If image j and image k are identical in the α channel for pixels i in the at least one stationary region of interest (ROI), then $SAD_{\alpha jk}=0$. Summing over all channels gives $$SAD_{jk} = \sum_{\alpha} SAD_{\alpha jk},$$

the sum of absolute differences (SAD) of pixel values between image j and image k in all channels for pixels i in the at least one stationary region of interest (ROI), a measure of the amount of difference between image j and image k for pixels i in the at least one stationary region of interest (ROI).

In a particular embodiment, the images that have the at least one stationary region of interest are selected based at least in part on a sum of absolute differences (SAD) being at or below a threshold value. For example, for a stationary region of interest of 200 pixels by 80 pixels, a threshold value t=500 may be used, so that when the sum of absolute differences (SAD) of pixel values $SAD_{jk} \le t=500$, image j and image k may be selected to be combined.

In a particular embodiment, the images that have the at least one stationary region of interest are each assigned an opacity value based at least in part on the sum of absolute differences (SAD), where the opacity value is used in averaging the pixel values from the subset of the multiple sequential images to produce the combined image. For example, using image j as the reference image, when the sum of absolute differences (SAD) of pixel values $0 \le SAD_{jk} \le 200$, image k may be assigned an opacity value of 50%, when $201 \le SAD_{jk} \le 300$, image k may be assigned an opacity value of 40%, when $301 \le SAD_{jk} \le 400$, image k may be assigned an opacity value of 30%, and when $401 \le SAD_{jk} \le 500$, image k may be assigned an opacity value of 20%.

The opacity values may be used to generate weights to apply to the pixel values when the selected images are combined. For example, when four images have low sums of absolute differences (SADs) relative to a base or reference image, the opacity values of the four images may be 50%, 50%, 40%, and 20%, respectively. The base or reference image may be assigned the opacity value of the image (or images) with the lowest sum of absolute differences (SAD), which in this case is an opacity value of 50%. The weight to apply to the pixel values of each image may be equal to the opacity value for that image divided by the sum of all the opacity values of the images to be combined. Here, the sum of all the opacity values of the images to be combined is 50+50+50+40+20=210. For example, the red, green, and blue pixel values of the base or reference image may be all multiplied by 50/210, the red, green, and blue pixel values of each of the other images with an opacity value of 50% may also be multiplied by 50/210, the red, green, and blue pixel values of the image with an opacity value of 40% may be multiplied by 40/210, and the red, green, and blue pixel values of the image with an opacity value of 20% may be multiplied by 20/210. The weighted pixel values of the five images may be averaged to produce the combined image.

In a particular embodiment, the images that have the at least one stationary region of interest are selected based at least in part on a sum of squares of differences (SSD) of pixel values between respective images in at least one channel for pixels in the at least one stationary region of interest. For example, the sum of squares of differences (SSD) of pixel values between a first image, referred to as image 1, and a second image, referred to as image 2, in a red (R) channel for pixels i in the at least one stationary region of interest (ROI) may be defined by $$SSD_{R12} = \sum_{i \in ROI} (R_{i1} - R_{i2})^2,$$

where $R_{i1}$ is the red value of pixel i in image 1 and $R_{i2}$ is the red value of pixel i in image 2. Generally, the sum of squares of differences (SSD) of pixel values between image j and image k in the α channel for pixels i in the at least one stationary region of interest (ROI) may be defined by $$SSD_{\alpha jk} = \sum_{i \in ROI} (\alpha_{ij} - \alpha_{ik})^2,$$

where α=R, G, B or α=Y, Cb, Cr, for example. If image j and image k are identical in the α channel for pixels i in the at least one stationary region of interest (ROI), then $SSD_{\alpha jk}=0$. Summing over all channels gives $$SSD_{jk} = \sum_{\alpha} SSD_{\alpha jk},$$

the sum of squares of differences (SSD) of pixel values between image j and image k in all channels for pixels i in the at least one stationary region of interest (ROI), a measure of the amount of difference between image j and image k for pixels i in the at least one stationary region of interest (ROI).

In a particular embodiment, the images that have the at least one stationary region of interest are selected based at least in part on a sum of squares of differences (SSD) being at or below a threshold value. For example, for a stationary region of interest of 200 pixels by 80 pixels, a threshold value T=500 may be used, so that when the sum of squares of differences (SSD) of pixel values $SSD_{jk} \le T=500$, image j and image k may be selected to be combined.

In a particular embodiment, the images that have the at least one stationary region of interest are each assigned an opacity value based at least in part on the sum of squares of differences (SSD), where the opacity value is used in averaging the pixel values from the subset of the multiple sequential images to produce the combined image. For example, using image j as the reference image, when the sum of squares of differences (SSD) of pixel values $0 \le SSD_{jk} \le 200$, image k may be assigned an opacity value of 50%, when $201 \le SSD_{jk} \le 300$, image k may be assigned an opacity value of 40%, when $301 \le SSD_{jk} \le 400$, image k may be assigned an opacity value of 30%, and when $401 \le SSD_{jk} \le 500$, image k may be assigned an opacity value of 20%.

The opacity values may be used to generate weights to apply to the pixel values when the selected images are combined. For example, when three images have low sums of squares of differences (SSDs) relative to a base or reference image, the opacity values of the three images may be 50%, 40%, and 20%, respectively. The base or reference image may be assigned the opacity value of the image (or images) with the lowest sum of squares of differences (SSD), which in this case is an opacity value of 50%. The weight to apply to the pixel values of each image may be equal to the opacity value for that image divided by the sum of all the opacity values of the images to be combined. Here, the sum of all the opacity values of the images to be combined is 50+50+40+20=160. For example, the red, green, and blue pixel values of the base or reference image may be all multiplied by 50/160, the red, green, and blue pixel values of the other image with an opacity value of 50% may also be multiplied by 50/160, the red, green, and blue pixel values of the image with an opacity value of 40% may be multiplied by 40/160, and the red, green, and blue pixel values of the image with an opacity value of 20% may be multiplied by 20/160. The weighted pixel values of the four images may be averaged to produce the combined image.

A base or reference image may be chosen that leads to a lowest set of sums of absolute differences (SADs) or to a lowest set of sums of squares of differences (SSDs). For example, for n images, each image may be chosen in turn as the base or reference image and the sum of absolute differences (SAD) or the sum of squares of differences (SSD) may be computed for all the other (n−1) images relative to that base or reference image. The number of images to combine m may be predetermined and then the base or reference image may be selected. In this way, the base or reference image that provides the lowest group (m images) of sums of absolute differences (SADs) or sums of squares of differences (SSDs) may be found. For example, m may be equal to three or four. Such a search method may be useful when the camera cannot store all n images and will stop processing images of the burst of images resulting from a single capture command once there are m images that are aligned well with each other. The image processing can be performed in hardware in the image processing system 130 on-the-fly or afterward in the image storage 150. Increments other than one may be used in this search method. For example, every fifth image may be evaluated as the base or reference image.

Motion of the hand holding the image capture device and motion of the subject may be correlated from image to image. If a given image when used as a base or reference image produces a group of sums of absolute differences (SADs) or sums of squares of differences (SSDs) that are above a threshold value, then images near the given image may do the same. A binary search method may be used. For example, if there are 100 images, images 25, 50, and 75 may be chosen as the base or reference images. Depending on which base image produced the lowest group of sums of absolute differences (SADs) or sums of squares of differences (SSDs), the search interval may be cut in half. For example, if image 75 as the base or reference image produced the lowest group of sums of absolute differences (SADs) or sums of squares of differences (SSDs), then a search interval of 12 may be used instead of an interval of 25, so that images 63 and 87 may be used as the base or reference image. If image 63 as the base or reference image produced the lowest group of sums of absolute differences (SADs) or sums of squares of differences (SSDs), then a search interval of 6 may be used instead of an interval of 12, so that images 57 and 69 may be used as the base or reference image. The binary search may continue until the search interval is one image.

In a particular embodiment, the subset of the multiple sequential images is sharpened before averaging pixel values from each image in the subset of the multiple sequential images. For example, the subset 141 of the multiple sequential images 107 of FIG. 1 may be sharpened in the sharpening module 145 before being combined in the image combination module 142. In a particular embodiment, selecting the subset of the multiple sequential images 200 that are aligned to each other includes detecting in real-time a first set of images, such as the dark frames 202, 204, 206, 208, and 214, having at least one stationary region of interest, where the object 222 is in the region of interest 224, and removing a second set of images, such as the light frames 210, 212, 216, 218, and 220, not having the at least one stationary region of interest, where the object 222 is not in the region of interest 224. In a particular embodiment, up to sixty sequential images captured by the image capture device 101 of FIG. 1 are received before selecting the subset of the multiple sequential images that are aligned to each other.

Figure 5:
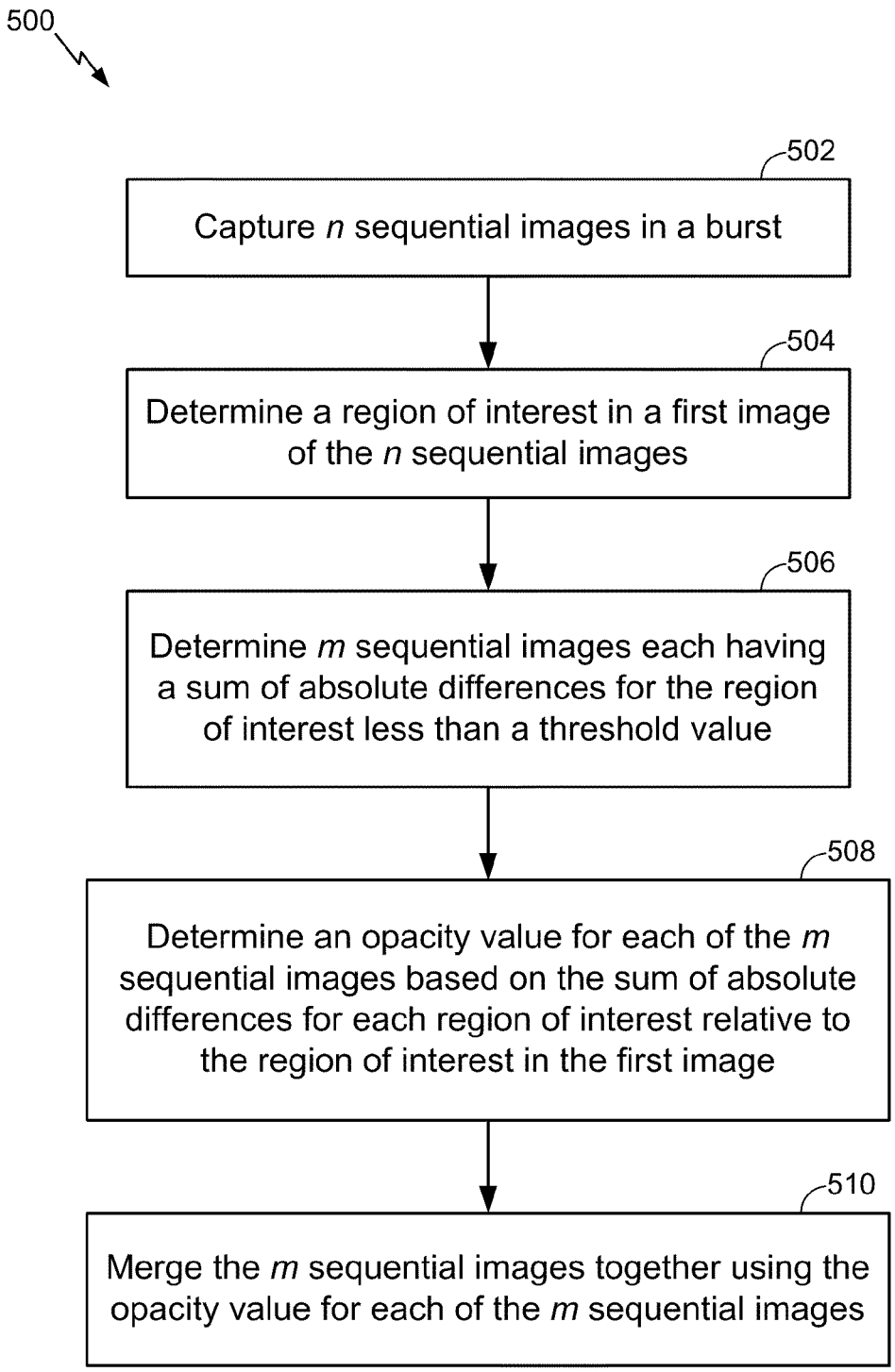
FIG. 5 is a flow diagram of a first illustrative embodiment of a method of image selection and combination.

Referring to FIG. 5, a flow diagram of a first illustrative embodiment of a method to select and combine multiple sequential images that are aligned to each other is shown at 500. For example, the method 500 may be performed by the image selection and combination system 100 of FIG. 1. The method 500 includes capturing n sequential images in a burst, at 502. For example, up to about sixty sequential images, each having six megapixels (MPs), may be captured in a burst of about one second. The method 500 also includes determining a region of interest in a first image of the n sequential images, at 504. For example, the region of interest may be a pair of eyes. As shown in FIG. 2, the region of interest 224 may have a stationary object 222.

The method 500 further includes determining m sequential images each having a sum of absolute differences (SAD) for the region of interest less than a threshold value, at 506. For example, m may be in a range of about two to about ten. When the region of interest is about 200 pixels by about 80 pixels, the threshold value may be about 500. As shown in FIG. 3, the subset of the dark frames 308, 310, 314, 316, and 318 may each have a sum of absolute differences (SAD) with respect to the dark frame 302 in the region of interest (ROI) that is less than or equal to a threshold value t.

The method 500 also includes determining an opacity value for each of the m sequential images based on the sum of absolute differences (SAD) for each region of interest relative to the region of interest in the first image, at 508. For example, using image j as the first image, when the sum of absolute differences (SAD) of pixel values $0 \leq SAD_{jk} \leq 200$, image k may be assigned an opacity value of 50%, when $201 \leq SAD_{jk} \leq 300$, image k may be assigned an opacity value of 40%, when $301 \leq SAD_{jk} \leq 400$, image k may be assigned an opacity value of 30%, and when $401 \leq SAD_{jk} \leq 500$, image k may be assigned an opacity value of 20%. The first image has $SAD_{jj}=0$, so the first image may be included in the m sequential images each having a sum of absolute differences (SAD) for each region of interest less than a threshold value.

The method 500 further includes merging the m sequential images together using the opacity value for each of the m sequential images, at 510. For example, for m=5, when four images have low sums of absolute differences (SADs) relative to the first image, the opacity values of the four images may be 50%, 40%, 40%, and 20%, respectively. The first image may be assigned an opacity value of 50%. The weight to apply to the pixel values of each image may be equal to the opacity value for that image divided by the sum of all the opacity values of the images to be combined, where the sum of all the opacity values in this case is 50+50+40+40+20=200. For example, the red, green, and blue pixel values of the first image may be all multiplied by 50/200, the red, green, and blue pixel values of the other image with an opacity value of 50% may also be multiplied by 50/200, the red, green, and blue pixel values of each of the images with an opacity value of 40% may be multiplied by 40/200, and the red, green, and blue pixel values of the image with an opacity value of 20% may be multiplied by 20/200. The properly weighted pixel values of the m=5 sequential images may then be averaged to produce the combined or merged image.

Figure 6:
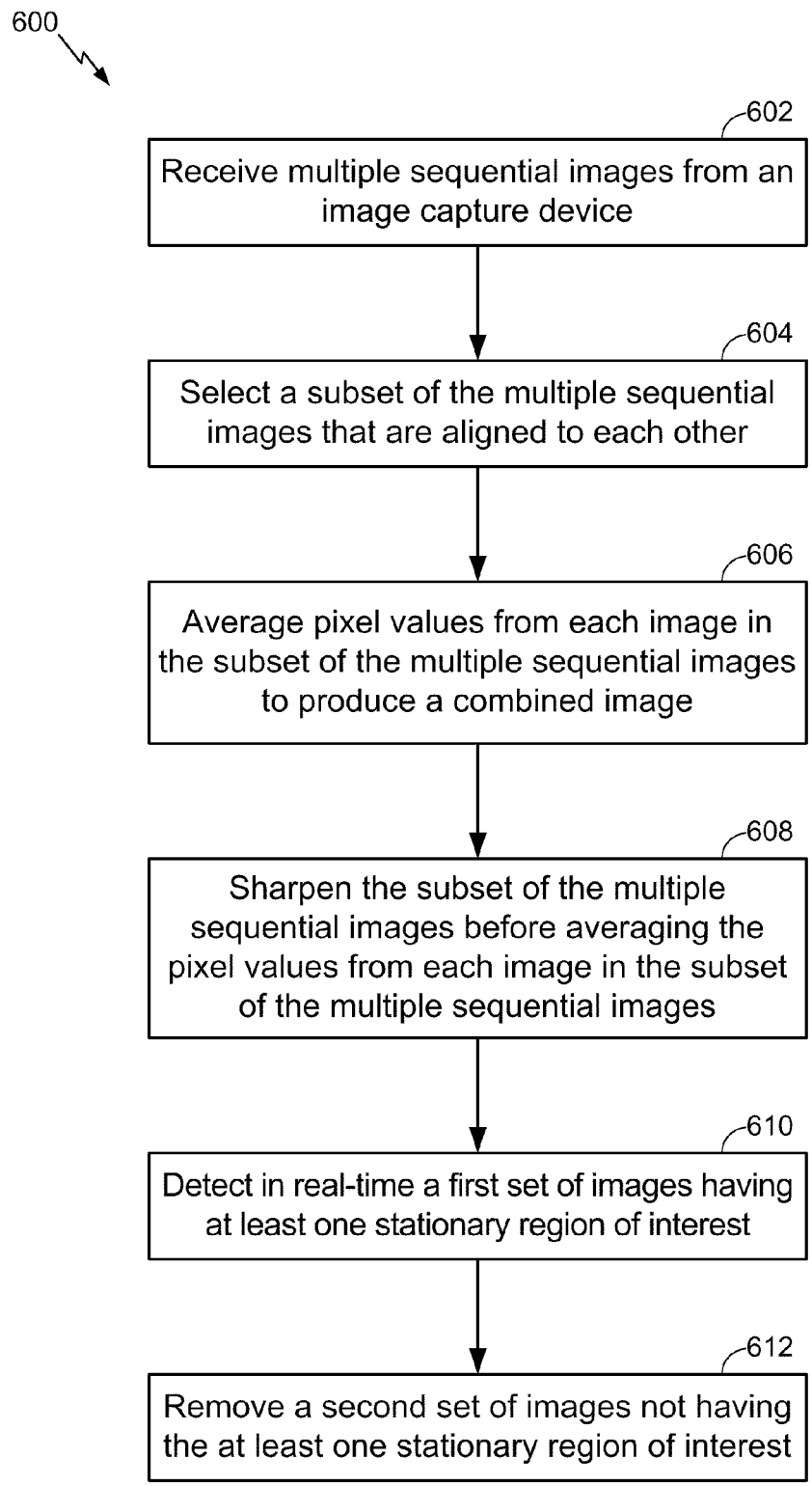
FIG. 6 is a flow diagram of a second illustrative embodiment of a method of image selection and combination.

Referring to FIG. 6, a flow diagram of a second illustrative embodiment of a method to select and combine multiple sequential images that are aligned to each other is shown at 600. The method 600 includes receiving multiple sequential images captured by an image capture device, at 602. For example, the multiple sequential images 107 may be captured by the image capture device 101 of FIG. 1. The method 600 also includes selecting a subset of the multiple sequential images that are aligned to each other, at 604. For example, the dark frames 202, 204, 206, 208, and 214 of FIG. 2 may be selected as a subset of the multiple sequential images 200 that are aligned to each other. The method 600 further includes averaging pixel values from each image in the subset of the multiple sequential images to produce a combined image, at 606. For example, pixel values from each of the dark frames 202, 204, 206, 208, and 214 of FIG. 2 may be averaged to produce a combined image similar to the combined image 226.

The method 600 also includes sharpening the subset of the multiple sequential images before averaging the pixel values from each image in the subset of the multiple sequential images, at 608. For example, the subset 141 of the multiple sequential images 107 of FIG. 1 may be sharpened in the sharpening module 145 before being combined in the image combination module 142. The method 600 further includes detecting in real-time a first set of images having at least one stationary region of interest, at 610. For example, selecting the subset of the multiple sequential images 200 of FIG. 2 that are aligned to each other may include detecting in real-time a first set of images, such as the dark frames 202, 204, 206, 208, and 214, having at least one stationary region of interest, where the object 222 is in the region of interest 224. The method 600 also includes removing a second set of images not having the at least one stationary region of interest, at 612. For example, selecting the subset of the multiple sequential images 200 of FIG. 2 that are aligned to each other may include removing a second set of images, such as the light frames 210, 212, 216, 218, and 220, not having the at least one stationary region of interest, where the object 222 is not in the region of interest 224.

In a particular embodiment, an apparatus includes means for selecting a subset of multiple sequential images that are aligned to each other. The means for selecting a subset of the multiple sequential images that are aligned to each other may include an image processing system such as the image processing system 130 of FIG. 1 having the image selection module 140, image processing circuitry, corresponding hardware, firmware, or any combination thereof. For example, the image processing system 130 of FIG. 1 having the image selection module 140 may be programmed to execute an algorithm to select a subset of the multiple sequential images that are aligned to each other. The apparatus further includes means for averaging pixel values from each image in the subset of the multiple sequential images to produce a combined image. The means for averaging pixel values from each image in the subset of the multiple sequential images to produce a combined image may include an image processing system such as the image processing system 130 of FIG. 1 having the image combination module 142, image processing circuitry, corresponding hardware, firmware, or any combination thereof. For example, the image processing system 130 of FIG. 1 having the image combination module 142 may be programmed to execute an algorithm to average pixel values from each image in the subset of the multiple sequential images to produce a combined image.

Figure 7:
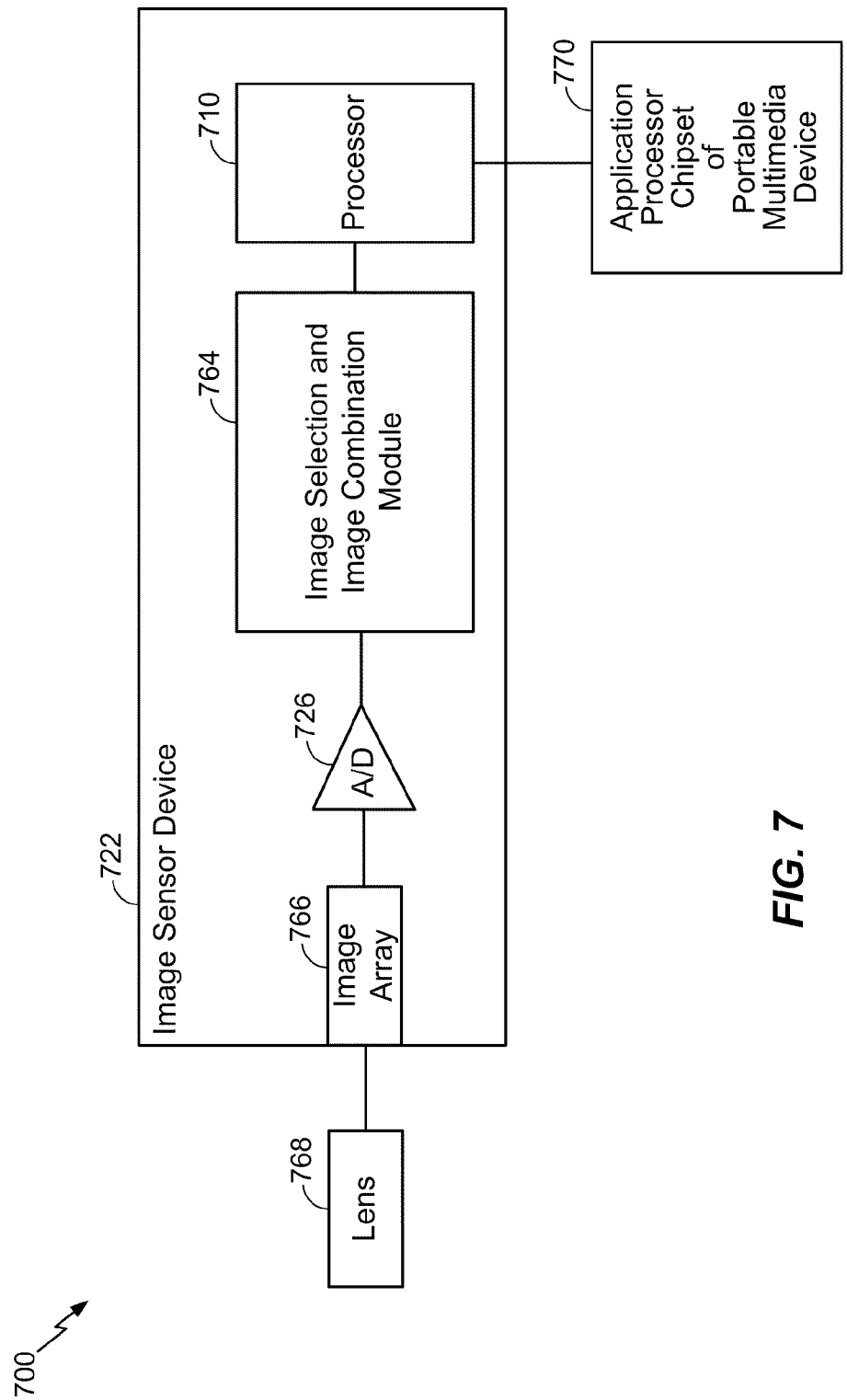
FIG. 7 is a block diagram of a particular embodiment of a device including an image selection and combination module.

FIG. 7 is a block diagram of particular embodiment of a system 700 including an image selection and image combination module. The system 700 includes an image sensor device 722 that is coupled to a lens 768 and also coupled to an application processor chipset of a portable multimedia device 770. The image sensor device 722 includes an image selection and image combination module 764 to select a subset of multiple sequential images that are aligned to each other and average pixel values from each image in the subset of the multiple sequential images to produce a combined image, such as by implementing the image selection module 140 and the image combination module 142 of FIG. 1, by operating in accordance with any of the embodiments of FIGS. 5-6, or any combination thereof.

The image selection and image combination module 764 is coupled to receive image data from an image array 766, such as via an analog-to-digital convertor 726 that is coupled to receive an output of the image array 766 and to provide the image data to the image selection and image combination module 764.

The image sensor device 722 may also include a processor 710. In a particular embodiment, the processor 710 is configured to implement the image selection and image combination module 764. In another embodiment, the image selection and image combination module 764 is implemented as image processing circuitry.

In a particular embodiment, an integrated circuit that includes image processing circuitry is configured to process multiple sequential images. The image processing circuitry is configured to select a subset of the multiple sequential images that are aligned to each other. For example, the frames 202, 204, 206, 208, and 214 of FIG. 2 may be selected as a subset of the multiple sequential images that are aligned to each other. The image processing circuitry is also configured to average pixel values from each image in the subset of the multiple sequential images to produce a combined image. For example, pixel values from each of the frames 202, 204, 206, 208, and 214 of FIG. 2 may be averaged to produce a combined image.

The processor 710 may also be configured to perform additional image processing operations, such as one or more of the operations performed by an image processing system. The processor 710 may provide processed image data to the application processor chipset of the portable multimedia device 770 for further processing, transmission, storage, display, or any combination thereof.

Figure 8:
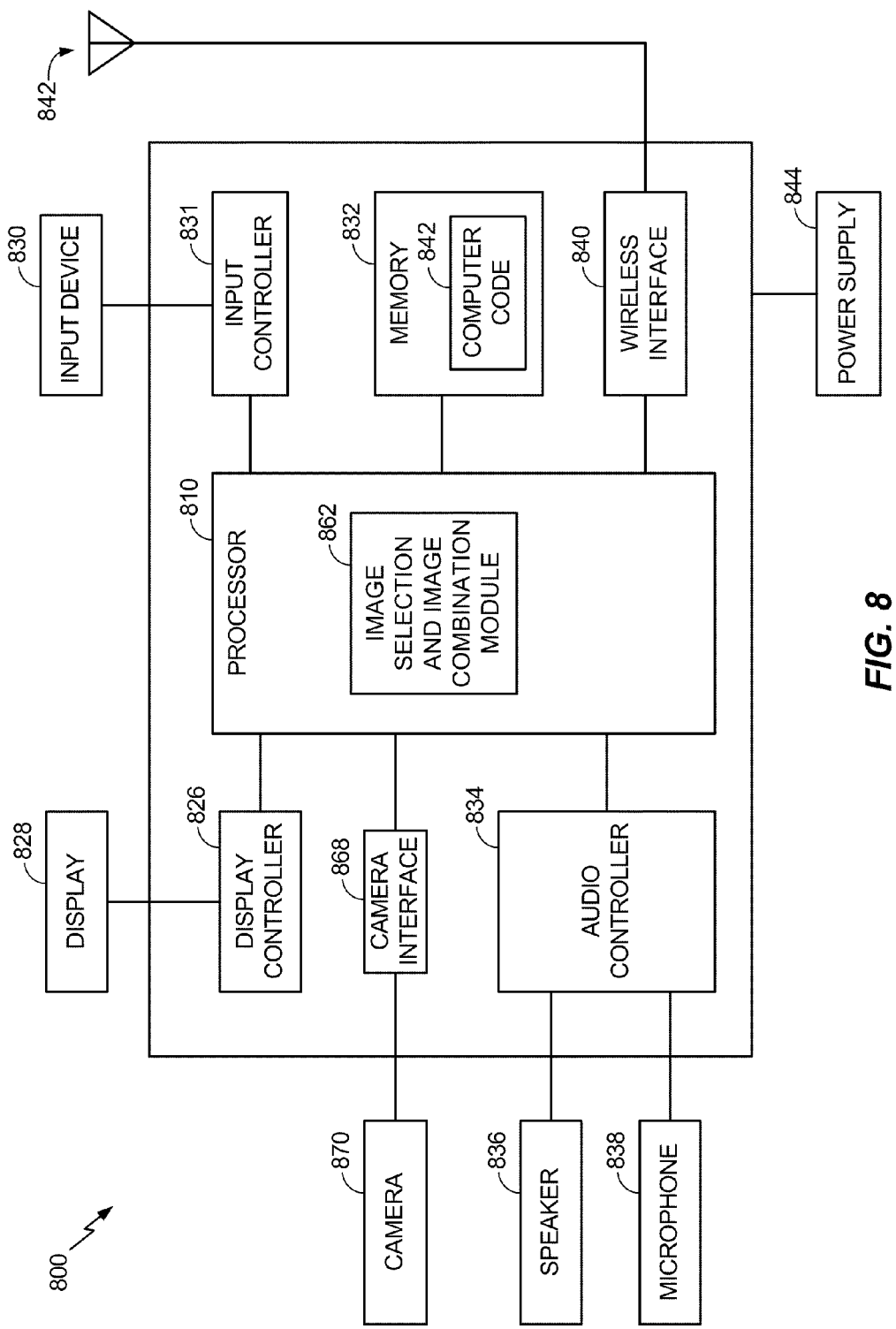
FIG. 8 is a block diagram of a particular embodiment of a portable communication device including an image selection and combination module.

FIG. 8 is a block diagram of an embodiment of a wireless communication device 800 having an image selection and image combination module and a display to display a combined image. The wireless communication device 800 may include a portable device that includes a processor 810, such as a digital signal processor (DSP) or microcontroller, coupled to a memory 832. The memory 832 is a readable, tangible medium to store computer code 842 that, when executed by the processor 810, causes the processor 810 to perform operations for image selection and image combination and to perform other processes. The processor 810 includes an image selection and image combination module 862. In an illustrative example, the image selection and image combination module 862 selects a subset of multiple sequential images that are aligned to each other and averages pixel values from each image in the subset of the multiple sequential images to produce a combined image, such as by implementing the image selection module 140 and the image combination module 142 of FIG. 1, by operating in accordance with any of the embodiments of FIGS. 5-6, or any combination thereof. The image selection and image combination module 862 may be in the processor 810 or may be a separate device or circuitry along a hardware image processing pipeline, or a combination thereof.

In an implementation of the image selection and image combination module 862, the computer-readable medium such as the memory 832 includes the computer executable code 842 for receiving multiple sequential images captured by an image capture device. For example, the processor 810 may use the computer executable code 842 to receive multiple sequential images captured by an image capture device such as a camera 870. The camera 870 may be a digital still camera, for example. The computer-readable medium such as the memory 832 also includes the computer executable code 842 for selecting a subset of the multiple sequential images that are aligned to each other. For example, the processor 810 having the image selection and image combination module 862 may use the computer executable code 842 to select a subset of the multiple sequential images that are aligned to each other. The computer-readable medium such as the memory 832 further includes the computer executable code 842 for averaging pixel values from each image in the subset of the multiple sequential images to produce a combined image. For example, the processor 810 having the image selection and image combination module 862 may use the computer executable code 842 to average pixel values from each image in the subset of the multiple sequential images to produce a combined image.

A camera interface 868 is coupled to the processor 810 and is also coupled to the camera 870. The camera 870 may be a still image camera. A display controller 826 is coupled to the processor 810 and to a display device 828. In a particular embodiment, the multiple sequential images include data representative of a physical object and averaging the pixel values from each image in the subset of the multiple sequential images transforms the data to reduce an amount of noise in the combined image. The transformed data may be displayed via the display device 828. An audio controller 834 can also be coupled to the processor 810. A speaker 836 and a microphone 838 can be coupled to the audio controller 834. A wireless interface 840 can be coupled to the processor 810 and to an antenna 842. An input device 830 for receiving and coupling inputs to the system 800 may also be coupled to the system 800 by an input controller 831.

During operation of the system of FIG. 8, a user may take a picture using the camera 870. The image data captured by the camera 870 is coupled by way of a camera interface 868 to the processor 810. The image selection and image combination module 862 within the processor 810 may select a subset of multiple sequential images that are aligned to each other and may average pixel values from each image in the subset of the multiple sequential images to produce a combined image according to the computer code 842 stored in the memory 832. The display 828 may display the combined image. Images captured by the camera 870 may be transmitted by the system 800 wirelessly by way of the wireless interface 840 and the antenna 842. The captured images also may be stored in the memory 832.

Those of skill would further appreciate that the various illustrative logical blocks, configurations, modules, circuits, and algorithm steps described in connection with the embodiments disclosed herein may be implemented as electronic hardware, computer software, or combinations of both. To clearly illustrate this interchangeability of hardware and software, various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disk read-only memory (CD-ROM), or any other form of storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope possible consistent with the principles and novel features as defined by the following claims.

The invention claimed is:

1. A method comprising:
receiving multiple sequential images captured by an image capture device, wherein the multiple sequential images comprise images that are aligned to each other and images that are not aligned to each other;
selecting a subset of the multiple sequential images that are determined to be aligned to each other based on a stationary region of interest detected in the multiple sequential images, from the images that are aligned to each other and images that are not aligned to each other, wherein selecting the subset of the multiple sequential images based on the stationary region of interest comprises calculating a sum of absolute differences of pixel values between respective images in at least one channel for pixels in the stationary region of interest; and
averaging pixel values from each image in the subset of the multiple sequential images to produce a combined image.

2. The method of claim 1, wherein the multiple sequential images include data representative of a physical object, and wherein averaging the pixel values from each image in the subset of the multiple sequential images transforms the data to reduce an amount of noise in the combined image, and further comprising displaying the transformed data via a display device.

3. The method of claim 1, wherein the sum of absolute differences is at or below a threshold value.

4. The method of claim 1, wherein each image in the subset of multiple sequential images is assigned an opacity value based at least in part on the sum of absolute differences, wherein the opacity value is used in averaging the pixel values from the subset of the multiple sequential images to produce the combined image.

5. The method of claim 1, wherein selecting the subset of the multiple sequential images based on the stationary region of interest comprises calculating a sum of squares of differences of pixel values between respective images in at least one channel for pixels in the stationary region of interest.

6. The method of claim 5, wherein the sum of squares of differences is at or below a threshold value.

7. The method of claim 5, wherein each image in the subset of multiple sequential images is assigned an opacity value based at least in part on the sum of squares of differences, wherein the opacity value is used in averaging the pixel values from the subset of the multiple sequential images to produce the combined image.

8. The method of claim 1, further comprising:
sharpening the subset of the multiple sequential images before averaging pixel values from each image in the subset of the multiple sequential images.

9. The method of claim 1, wherein selecting the subset of the multiple sequential images that are determined to be aligned to each other includes detecting in real-time a first set of images having at least one stationary region of interest and removing a second set of images not having the at least one stationary region of interest.

10. The method of claim 9, wherein up to sixty sequential images captured by the image capture device are received before selecting the subset of the multiple sequential images that are aligned to each other.

11. The method of claim 1, further comprising:
capturing n sequential images in a burst;
determining a region of interest in a first image of the n sequential images;
determining m sequential images each having a sum of absolute differences for the region of interest that is less than a threshold value;
determining an opacity value for each of the m sequential images based on the sum of absolute differences for the region of interest in each of the m sequential images relative to the region of interest in the first image; and
merging the m sequential images together using the opacity value for each of the m sequential images.

12. An apparatus comprising:
an image processing system configured to:
receive multiple sequential images comprising images that are aligned to each other and images that are not aligned to each other,
select a subset of the multiple sequential images that are determined to be aligned to each other based on a stationary region of interest detected in the multiple sequential images, wherein the subset is selected from the images that are aligned to each other and images that are not aligned to each other, wherein the selection of the subset of the multiple sequential images based on the stationary region of interest comprises calculating a sum of absolute differences of pixel values between respective images in at least one channel for pixels in the stationary region of interest; and
average pixel values from each image in the subset of the multiple sequential images to produce a combined image.

13. The apparatus of claim 12, further comprising an image capture device configured to capture the multiple sequential images, wherein the multiple sequential images include data representative of a physical object, and wherein averaging the pixel values from each image in the subset of the multiple sequential images transforms the data to reduce an amount of noise in the combined image, and further comprising a display device configured to display the transformed data.

14. The apparatus of claim 12, wherein selecting the subset of the multiple sequential images that are determined to be aligned to each other includes detecting in real-time a first set of images having at least one stationary region of interest and removing a second set of images not having the at least one stationary region of interest.

15. An integrated circuit comprising:
image processing circuitry configured to process multiple sequential images to:
receive multiple sequential images comprising images that are aligned to each other and images that are not aligned to each other,
select a subset of the multiple sequential images that are determined to be aligned to each other based on a stationary region of interest detected in the multiple sequential images, wherein the subset is selected from the images that are aligned to each other and images that are not aligned to each other, wherein the selection of the subset of the multiple sequential images based on the stationary region of interest comprises calculating a sum of absolute differences of pixel values between respective images in at least one channel for pixels in the stationary region of interest; and
average pixel values from each image in the subset of the multiple sequential images to produce a combined image.

16. The integrated circuit of claim 15, wherein selecting the subset of the multiple sequential images that are determined to be aligned to each other includes detecting in real-time a first set of images having at least one stationary region of interest and removing a second set of images not having the at least one stationary region of interest.

17. An apparatus comprising:
means for receiving multiple sequential images comprising images that are aligned to each other and images that are not aligned to each other,
means for selecting a subset of the multiple sequential images that are determined to be aligned to each other based on a stationary region of interest detected in the multiple sequential images, wherein the subset is selected from the images that are aligned to each other and images that are not aligned to each other, the means for selecting the subset of the multiple sequential images configured to calculate a sum of absolute differences of pixel values between respective images in at least one channel for pixels in the stationary region of interest; and
means for averaging pixel values from each image in the subset of the multiple sequential images to produce a combined image.

18. The apparatus of claim 17, further comprising an image capture device configured to capture the multiple sequential images, wherein the multiple sequential images include data representative of a physical object, and wherein averaging the pixel values from each image in the subset of the multiple sequential images transforms the data to reduce an amount of noise in the combined image, and further comprising a display device configured to display the transformed data.

19. The apparatus of claim 17, wherein selecting the subset of the multiple sequential images that are determined to be aligned to each other includes detecting in real-time a first set of images having at least one stationary region of interest and removing a second set of images not having the at least one stationary region of interest.

20. A non-transitory computer-readable medium storing computer executable code comprising:
code for receiving multiple sequential images from an image capture device, wherein the multiple sequential images comprise images that are aligned to each other and images that are not aligned to each other;
code for selecting a subset of the multiple sequential images that are determined to be aligned to each other based on a stationary region of interest detected in the multiple sequential images, from the images that are aligned to each other and images that are not aligned to each other, wherein the selection of the subset of the multiple sequential images comprises calculating a sum of absolute differences of pixel values between respective images in at least one channel for pixels in the stationary region of interest; and
code for averaging pixel values from each image in the subset of the multiple sequential images to produce a combined image.

21. The computer-readable medium of claim 20, wherein selecting the subset of the multiple sequential images that are determined to be aligned to each other includes detecting in real-time a first set of images having at least one stationary region of interest and removing a second set of images not having the at least one stationary region of interest.

* * * * *